May 12, 1959  J. C. NAVARI  2,886,082
PEELING AND GRATING APPARATUS
Filed Dec. 31, 1957  2 Sheets-Sheet 1

INVENTOR.
JULIUS C. NAVARI.
BY
ATTORNEYS.

May 12, 1959

J. C. NAVARI 2,886,082

PEELING AND GRATING APPARATUS

Filed Dec. 31, 1957

INVENTOR.
JULIUS C. NAVARI.
BY
ATTORNEYS.

2,886,082
PEELING AND GRATING APPARATUS

Julius C. Navari, Pittsburgh, Pa.

Application December 31, 1957, Serial No. 706,312

6 Claims. (Cl. 146—3)

My invention relates to apparatus for removing in comminuted form the skins or rinds of fruits and vegetables, and consists in certain new and useful improvements in apparatus for such purpose.

The object of the invention is to provide an apparatus which is more economical to construct and more effective in service than the apparatus hitherto known to the art.

Apparatus embodying the invention is in exemplary way illustrated in the accompanying drawings, in which.

Figure 3:
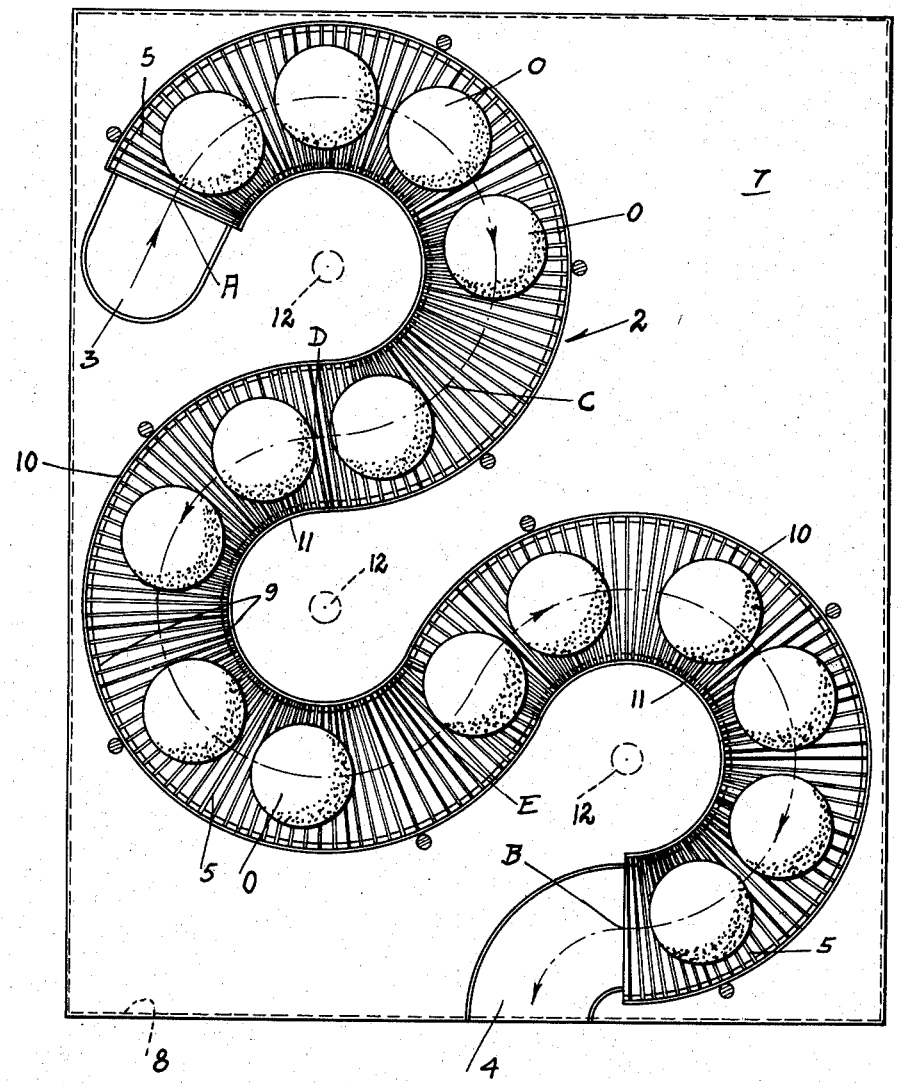
Fig. 3 is a view in plan of the apparatus with certain cutter heads and guards removed.

Referring to Fig. 3 of the drawings, the apparatus will be understood to comprise a serpentine channel 2, into which the fruits or vegetables O, whose skins or rinds are to be peeled or grated away, are introduced at 3 and are discharged at 4. In the ensuing specification and claims oranges will be referred to as the produce which may be processed in the apparatus, but it will be understood that other approximately spheroidal fruits and vegetables are intended by words "orange and oranges."

Figure 2:
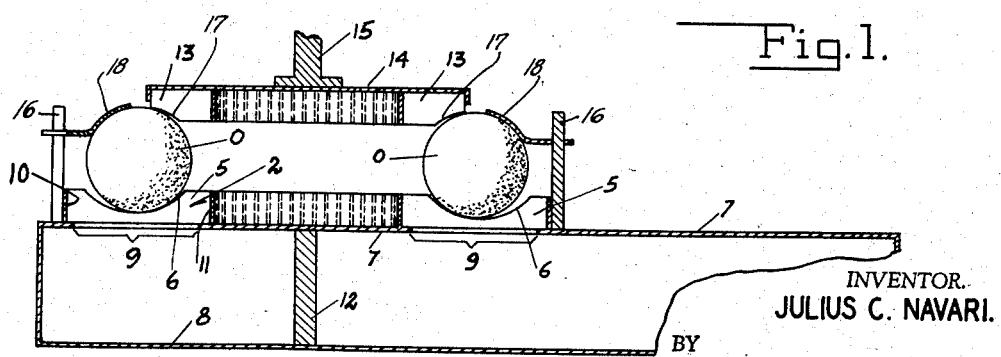
Fig. 2 is a fragmentary sectional view, as seen on the plane II—II of Fig. 1.

The orange-supporting bottom of the serpentine channel 2 is formed of a series of closely spaced vertical blades 5 whose top edges are downwardly concaved, as at 6. The blades 5 are supported upon a steel plate 7 that forms the top of a receptacle 8 (Fig. 2). Between the points A and B (Fig. 3) of the serpentine channel the plate 7 includes a serpentine slot 9, and the vertical blades 5 extend transversely of and are supported at their opposite ends upon the respective margins of this slot, while at their opposite ends the blades 5 are united to rigid side strips 10 and 11 of steel. Rigid posts 12 extend upwardly from the floor of the receptacle 8 to support the slotted plate 7 at desired points. The union of the parts described may be effected by brazing or welding, or by means of any suitable fastening devices. Longitudinally of the channel 2 the blades 5 are arranged in closely spaced relation, and the spaces between the blades are directed downwardly towards the receptacle 8 below the blades.

The downwardly concaved top edges 6 of the closely spaced blades 5 form a trough that extends longitudinally of the serpentine channel, and it may be noted that such trough is preferably eccentric with respect to the centerline C (Fig. 3) of the channel 2; that is, the blades 5 may be so positioned transversely of the channel that the centerline of each blade is located 3/16" to the left (Fig. 2) of the centerline of the channel.

As shown in Fig. 3, the serpentine channel 2, whose bottom is essentially formed by the blades 5, comprises three channel sections A—D, D—E and E—B of circular segmental or arcuate form; the three channel sections are arranged in succession, end to end, and it will be understood that for processing certain fruits or vegetables the channel may comprise either more or less than the three arcuate series of blades 5, shown in exemplary way herein.

Above each of said three arcuate channel sections a head 14, carrying a circular series of blades 13, is mounted for rotation on an axis 15 that is concentric with the center of the associate arcuate series of blades 5. A suitable electric-motor drive (not shown) may be provided for driving the head 14, whereby the blades 13 are caused to travel longitudinally of the series of blades 5 in the particular channel section. The blades 13 are only about one-half the length of the blades 5, and each blade 13 is provided with an upwardly concave edge 17 that bears downwardly on the oranges beneath it.

The weight of the head normally gives the required pressure of engagement of the blades 13 with the oranges, but additional pressure may be applied by any suitable means within the knowledge of the artisan. The blades 13 are, as shown in Fig. 2, positioned eccentrically of the center of the channel, say 3/16" radially inward from the centerline of the channel 2.

The concave edges of the blades 5 and 13 are sharp edges, and they may be serrated edges, suitable for grating the rinds and skins of substantially rigid fruits and vegetables.

Figure 1:
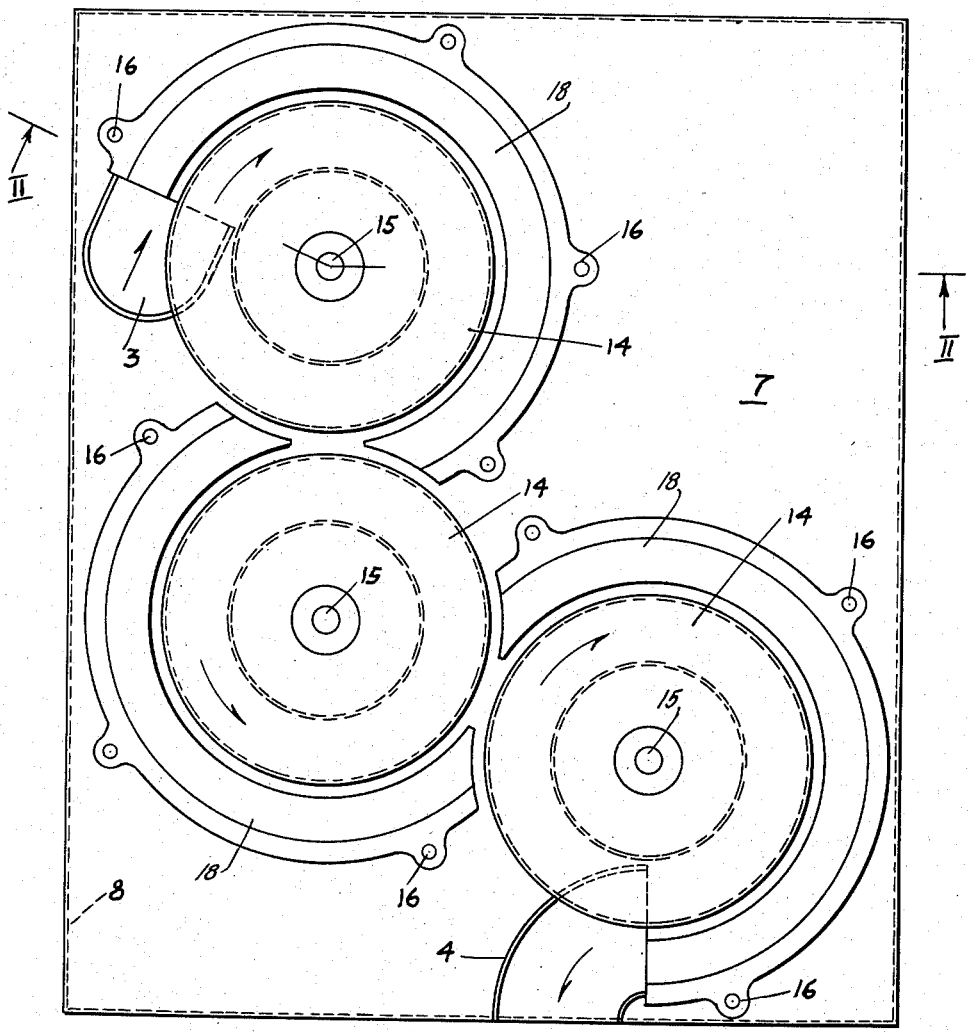
Fig. 1 is a view in plan of the apparatus.

Under the effect of the blades 13 of the first head 14 the oranges fed, as at 3, into the bladed channel section A—D are revolved and moved along the channel section, while the rinds of the oranges are progressively grated by the action of the edges of blades 5 and 13 moving relatively to each other. As the oranges reach the end of channel section A—D they enter channel section D—E, where the blades 13 of the second head 14 revolve the oranges in opposite direction and move them along the latter channel section. The action is repeated as the oranges leave channel section D—E and enter channel section E—B. This will be understood upon considering the arrows applied to the heads 14 in Fig. 1.

As the oranges reach the discharge chute 4, the grating away of the rinds of the oranges will have been completed to the desired degree. As the blades progressivly grate the rinds of the oranges in their travel through the serpentine channel, the grated or comminuted rind material falls through the spaces between the blades 5 into the receptacle 8, whence the material may be removed for such use as is to be made of it.

Since the blades 13 of each rotating head 14 engage the oranges eccentrically on the radially inner side of the centerline of the associate arcuate channel section, there is a tendency for the revolving oranges to move radially outward from the under blades of the rotating head. Means are provided to oppose this tendency, and such means comprise a guard 18 that extends longitudinally of the serpentine channel. The guard may advantageously take the form of a plurality of segmental collars (18), one for each rotating head 14. The collars are freely mounted on rigid pins 16, whereby the collars bear under their own weights on the oranges in the channel. The segmental collars 15 of the three heads 14 are shaped to form in effect a continuous "floating" guard along the serpentine channel.

Within the terms of the appended claims various modifications and elaborations of the structure described may be made by the artisan.

I claim:

1. Apparatus of the class described comprising a channel section extending on the arc of a circle, said channel section having a bottom comprised of the top edges of an arcuate series of vertical blades for the support of oranges, means for supporting said series of blades with the bodies of the individual blades extended transversely of the channel and with the several blades of the series arranged in closely spaced relation longitudinally of the arc, a receptacle mounted below said channel section, the spaces between said blades being downwardly directed towards said receptacle, and a circular series of spaced blades mounted above the channel section for rotation on an axis concentric with the center of the circular arc of said channel section, the blades of said circular series having bottom edges arranged to bear downwardly upon the oranges in the channel for effecting, during the rotation of said circular series of blades, a revolving movement of the oranges along the channel section while a grating action of the blade edges progressively removes the rinds of the oranges.

2. Apparatus as defined in claim 1, wherein the effective orange-contacting edges of the circular series of blades are located eccentrically of the centerline of the channel section, and an arcuate guard extending longitudinally of the channel in position to oppose the effect of such eccentricity on the moving oranges.

3. Apparatus of the class described, a serpentine channel comprising a succession of channel sections each formed on the arc of a circle, the bottom of said channel being comprised of the top edges of a series of vertical blades for the support of oranges, means for supporting said series of blades with the bodies of the individual blades extended transversely of the channel and with the several blades of the series arranged in closely spaced relation longitudinally of the channel, a receptacle mounted below said channel, and a circular series of spaced blades for each of at least two of said arcuate channel sections, each circular series of blades being mounted above its associate arcuate channel section for rotation on an axis concentric with the center of the circular arc of the channel section, the blades of each circular series having bottom edges arranged to bear downwardly upon the oranges in the associate channel section for effecting, during the rotation of said circular series of blades, a revolving movement of the oranges along said serpentine channel while a grating action of the blade edges progressively removes the rinds of the oranges.

4. Apparatus of the class described comprising a channel section extending on the arc of a circle, said channel section having a bottom comprised of downwardly concaved top edges of an arcuate series of blades for the support of oranges, means for supporting said series of blades with the bodies of the individual blades extended transversely of the channel and with the several blades of the series arranged in closely spaced relation longitudinally of the arc, a circular series of spaced blades mounted above the channel section for rotation on an axis concentric with the center of the circular arc of said channel section, the blades of said circular series having upwardly concaved bottom edges arranged to bear downwardly and eccentrically upon the oranges in the channel section for effecting, during the rotation of said circular series of blades, a revolving movement of the oranges along the channel section while a grating action of the blade edges progressively removes the rinds of the oranges, and an arcuate guard extending along the channel section in position to oppose the effect of the blade eccentricity on the moving oranges.

5. Apparatus of the class described comprising a channel section extending on the arc of a circle, said channel section having a bottom comprised of the top edges of an arcuate series of vertical blades for the support of oranges, means for supporting said series of blades with the bodies of the individual blades extended transversely of the channel and with the several blades of the series arranged in closely spaced relation longitudinally of the arc, and a circular series of spaced blades mounted above the channel section for rotation on an axis substantially concentric with the center of the circular arc of said channel section, the blades of said circular series having bottom edges arranged to bear downwardly upon the oranges in the channel for effecting, during the rotation of said circular series of blades, a revolving movement of the oranges along the channel section while a grating action of the blade edges progressively removes the rinds of the oranges.

6. Apparatus of the class described comprising a channel section extending on the arc of a circle, said channel section having a bottom comprised of the top edges of an arcuate series of vertical blades for the support of oranges, means for supporting said series of blades with the bodies of the individual blades extended transversely of the channel and with the several blades of the series arranged in closely spaced relation longitudinally of the arc, and a circular series of spaced blades mounted above the channel section for rotation on an axis substantially concentric with the center of the circular arc of said channel section, the blades of said circular series having bottom edges arranged to bear downwardly upon the oranges in the channel for effecting, during the rotation of said circular series of blades, a revolving movement of the oranges along the channel section while a grating action of the blade edges of progressively removes the rinds of the oranges, the effective orange-contacting edges of the circular series of blades being located eccentrically of the centerline of the channel section, and an arcuate guard extending longitudinally of the channel in position to oppose the effect of such eccentricity on the moving oranges.

References Cited in the file of this patent

UNITED STATES PATENTS

| 130,844 | Cook | Aug. 27, 1872 |
| 353,857 | Hobart | Dec. 7, 1886 |
| 1,116,880 | Giampietro | Nov. 10, 1914 |
| 2,206,748 | Moore | July 2, 1940 |
| 2,619,139 | Riggle et al. | Nov. 25, 1952 |